United States Patent Office 3,514,254
Patented May 26, 1970

3,514,254
PROCESS FOR PREPARING A SOLUTION CONTAINING HYDROXYLAMMONIUM SALT
Abraham Hermanus de Rooij, Geleen, Netherlands, assignor to Stamicarbon N.V., Heerlen, Netherlands
No Drawing. Filed May 3, 1965, Ser. No. 452,925
Int. Cl. C01b 25/00; C01g 1/10
U.S. Cl. 23—105                                    7 Claims

ABSTRACT OF THE DISCLOSURE

A process for preparing a solution containing hydroxylammonium salt which includes catalytically reducing nitrate ions in an aqueous solution using molecular hydrogen in the presence of a weakly acidic material selected from the group consisting of phosphoric acid, the alkali or ammonium salts thereof, alkali metal bisulfates and ammonium bisulfate so that the pH is buffered between 0–3.

---

The present invention relates to a process for preparing a solution containing hydroxylammonium salt by catalytic reduction of nitrate ions with the aid of molecular hydrogen.

It is well known that a solution containing hydroxylammonium salt can be obtained by catalytic reduction of the nitrate ions in an aqueous acid solution by contacting the same with molecular hydrogen in the presence of a noble-metal catalyst, such as palladium, platinum, or rhodium, whether or not on a carrier, and, if desired, in the presence of an acid, other than hydrochloric acid. The source of the nitrate ions in the solution is, of course, nitric acid, regardless of the mode of introduction of the nitrate ion (e.g., as a soluble salt). In this known method it is important, if the process is to proceed smoothly, that a protective amount of hydrogen be maintained over the catalyst surface during the reduction, as otherwise, for instance, a sudden interruption of the hydrogen supply or a less thorough mixing may give rise to undesired phenomena, such as:

(a) local decomposition of hydroxylamine accompanied by spontaneous formation of nitrogen or nitrous vapours;
(b) de-activation of the catalyst;
(c) dissolving of the catalyst, if it is a palladium catalyst.

The higher the nitric acid concentration in the solution containing catalyst, the greater the risk of these phenomena.

Especially in production of hydroxylamine, on an industrial scale, an objective is to obtain a solution of the product which is not too dilute. If a continuous process is employed, it is then desirable to continuously supply nitric acid at a concentration of about 40–60% by weight to the reaction medium. Under these conditions, however, the above-mentioned undesired phenomena are especially likely to occur at least locally, in spite of thorough mixing being applied, so that the practice of such a proposed operation becomes too risky to be fully useful.

It is therefore an object of this invention to provide an improved process for preparing an aqueous hydroxylammonium salt solution which will overcome the aforementioned difficulties and problems.

According to this invention these disadvantages are overcome by carrying out the above-described process wherein the nitrate ion reduction takes place in a weakly acidic medium obtained by introducing into the starting solution, in addition to nitrate ions from a solution nitrate, e.g. ammonium-, hydroxylammonium-, or an alkali nitrate, a weakly acidic material selected from the group consisting of phosphoric acid, the alkali metal and ammonium salts thereof, alkali metal bisulfates or ammonium bisufate so that the pH provided by this medium will be buffered between 0 and 3.

It has now been discovered that the reduction of nitrate ions to hydroxylamine, using hydrogen and noble metal catalyst as described above, still proceeds smoothly in such a weakly acidic medium, whether or not continuously, but the problem of avoiding the dissolving of the palladium catalyst and the formation of nitrogen or nitrous gases is substantially absent by this method. The process is easier to operate, as de-activation of the catalyst by accidental interruption of the supply of hydrogen to the catalyst surface need no longer be feared. This is a principal advantage of the invention. In addition to the phosphoric acid and salts thereof and the bisulfate salts mentioned above, there may also be used other weak inorganic and organic acids in which nitrate ions can be reduced to hydroxylamine. These alternative acids are not generally preferred at this time for practical application, since they are either too expensive, or especially in the case of organic acids, may unfavorably influence the catalytic activity of the catalyst used.

The invention also makes possible the preparation of aqueous hydroxylamine solutions of a higher concentration than can generally be obtained when the reduction is carried out with a true nitric acid solution, as, at the same hydrogen-ion concentration, the nitrate-ion concentration can now be many times higher in the weakly acid solution than in the nitric acid solution.

The weakly acid solution containing nitrate ions can be prepared in various ways. Thus, a soluble nitrate salt and a weakly acidic material such as phosphoric acid or a bisulfate such as an alkali metal or ammonium bisulfate can be dissolved together. Alternatively, phosphoric acid can be replaced with an alkali metal or ammonium salt thereof. Further nitric acid can be added either to a solution containing phosphoric acid and an alkali metal or ammonium phosphate, or to a solution containing an alkali metal or ammonium sulfate. The phosphoric acid can be replaced with an alkali metal or ammonium phosphate. Where an alkali metal or ammonium phosphate or sulfate is employed, the amount used is at least equal to the amount of nitric acid. The nitric acid is then converted into a soluble nitrate with simultaneous formation of phosphoric acid or bisulphate.

Advantageously the ammonium salt of the nitrate, phosphoric and the bisulfate may be used, since in the reduction of the nitrate ions ammonia is usually formed as a by-product of hydroxylamine production. Thus, if the ammonium salts are used, the solution will contain, in addition to the resulting hydroxylamine, no positive ions other than the ammonium ion.

Effective reduction in a weakly acid medium at a pH above 3 is not really achieved in practice, as the reaction rate appears to decrease rapidly or the reaction no longer takes place at all. On the other hand, in a phosphoric- or bisulphate-acid medium at a pH below 0 the aforesaid disadvantages observed in practicing the process in a nitric acid medium may again be present.

As in the known process, the catalysts may be employed with or without a supporting carrier in the process according to this invention. The nature of the carrier and the amount of catalyst put thereon may vary widely and the proportion, and selection of such catalysts is conventional and in accord with general practice.

Substances that may be used as carriers or supports are, for instance, silica gel and barium sulphate, but preferably use is made of active carbon and aluminum oxide. The amount of catalyst used may be about 5% by weight of the total weight of the vehicle and the catalyst. The catalyst concentration may also be varied within wide limits. For a reasonably rapid reduction it is desirable to use, for instance, 0.001–0.1 gram of a noble metal per 1 gram of nitrate. The temperature and pressure at which the reduction is carried out may also vary widely without rendering the reduction impossible or making the resulting hydroxylamine decompose. For instance, the temperature may be maintained at a value between the freezing point and, about 125° C.; but for the sake of simplicity and correct practice the ambient temperature or a slightly higher temperature, i.e., the range of 20–40° C. will be chosen. The pressure may be higher than atmospheric. The optimum pressure from an economical point of view is up to about 5 atm. gauge, as a pressure of this level does not yet involve a strong increase in the cost of investment, while the capacity is considerably enlarged. Operation outside of these preferred ranges does not affect the principles of the invention but generally will only add to the cost of the process.

To obtain a hydroxylamine solution that is as concentrated as possible, the nitrate in concentration in the reaction medium, or the solution added to this medium in a continuous operation will be chosen as high as possible; however the permissible concentration will depend somewhat on the temperature and on the acid used. At ambient temperatures, the nitrate in concentration may usefully be in the molar range of 1 to 5.

For a continuous operation of the process use may be made, for instance, of a reaction vessel which is equipped with a cooling jacket and a stirrer and in which a pressure of 5 atm. gauge and a temperature of 40° C. are maintained.

A solution containing 1960 kg. of $H_3PO_4$, 2200 kg. of $NH_4NO_3$, 5400 kg. of $H_2O$ and 75 kg. of hydrogen is continuously fed to this reaction vessel where it is retained for one hour in the presence of a Pd catalyst, and a solution containing hydroxylamine and having the composition 441 kg. of $H_3PO_4$, 1058 kg. of $NH_4H_2PO_4$, 825 kg. of $NH_3OH.H_2PO_4$, 1560 kg. of $NH_4NO_3$, 5714 kg. of $H_2O$ is continuously discharged from it. Gaseous component, 25.6 kg. mainly hydrogen, the remainder being nitrogen and nitrogen oxides, is also discharged per hour through a vent gas conduit.

The resulting hydroxylammonium phosphate solution is suitable as such to be converted, by reaction with cyclohexanone, directly to cyclohexanone oxime according to the process described in U.S. application Ser. No. 413,134, filed Nov. 23, 1964 corresponding to Dutch non-prepublished patent application 301,053, dated Nov. 27, 1963 which relates to the preparation of the oxime in a buffered medium.

I claim:
1. In the process for the preparation of an aqueous solution containing hydroxylammonium salt wherein nitrate ions in an acidic aqueous reaction medium in the reaction zone are reduced by molecular hydrogen in the presence of a catalyst at a temperature above at least the freezing point of the reaction medium the improvement consisting essentially of continuously supplying to the reaction zone a weakly acidic aqueous reaction medium containing a water-soluble nitrate and a weakly acidic material selected from the group consisting of phosphoric acid, an alkali metal or ammonium phosphate and an alkali metal or ammonium bisulfate, the concentration of said water-soluble nitrate being in the molar range of 1–5, said weakly acidly material being present in amounts sufficient to buffer the reaction medium at a pH between 0–3 and continuously withdrawing from the reaction zone hydroxylammonium salt of said weakly acidic material.

2. The process of claim 1 wherein the weakly acidic material is ammonium phosphate.

3. The process of claim 1 wherein the weakly acidic material is ammonium bisulfate.

4. The process of claim 1 wherein the temperature of the reaction medium is between about 20–40° C.

5. The process of claim 1 wherein the water-soluble source of nitrate ions is nitric acid.

6. The process of claim 1 wherein the water-soluble source of nitrate ions is ammonium nitrate.

7. The process of claim 1 wherein the catalyst is present in amounts of 0.001–1 gram per gram of nitrate.

References Cited
UNITED STATES PATENTS

| | | | |
|---|---|---|---|
| 2,827,362 | 3/1958 | Bull et al. | 23—117 X |
| 2,628,888 | 2/1953 | Benson | 23—105 X |

HERBERT T. CARTER, Primary Examiner

U.S. Cl. X.R.

23—50, 117, 190